Aug. 23, 1949.                   M. BAINBRIDGE ET AL                   2,479,665
                        APPARATUS FOR BULK HANDLING OF PINEAPPLES
Filed May 27, 1946                                              3 Sheets-Sheet 1
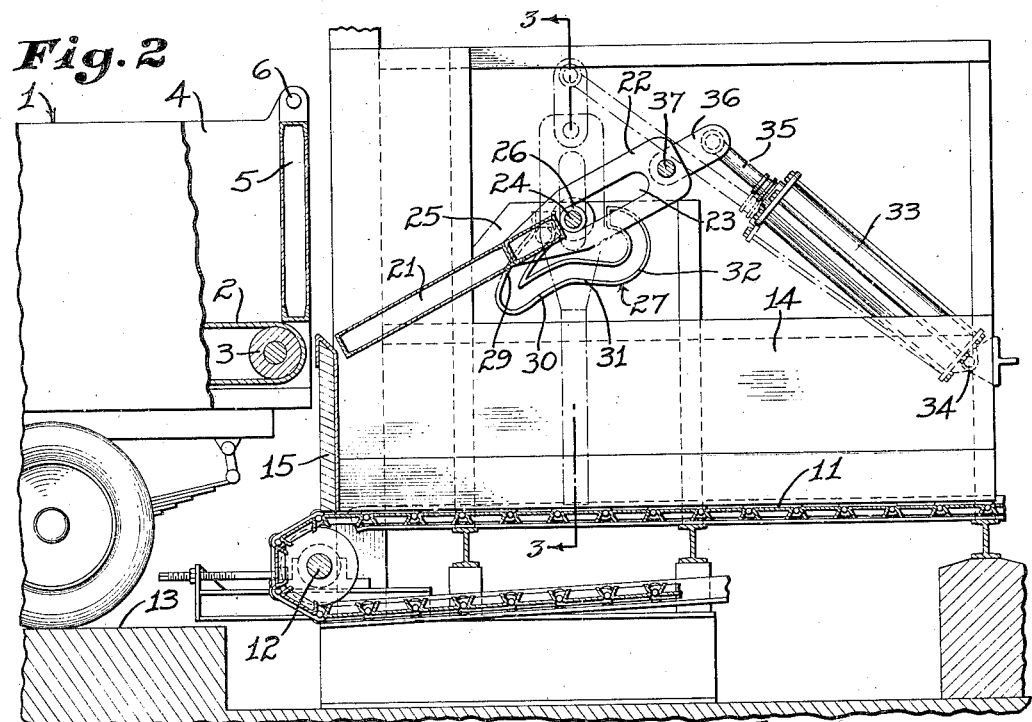
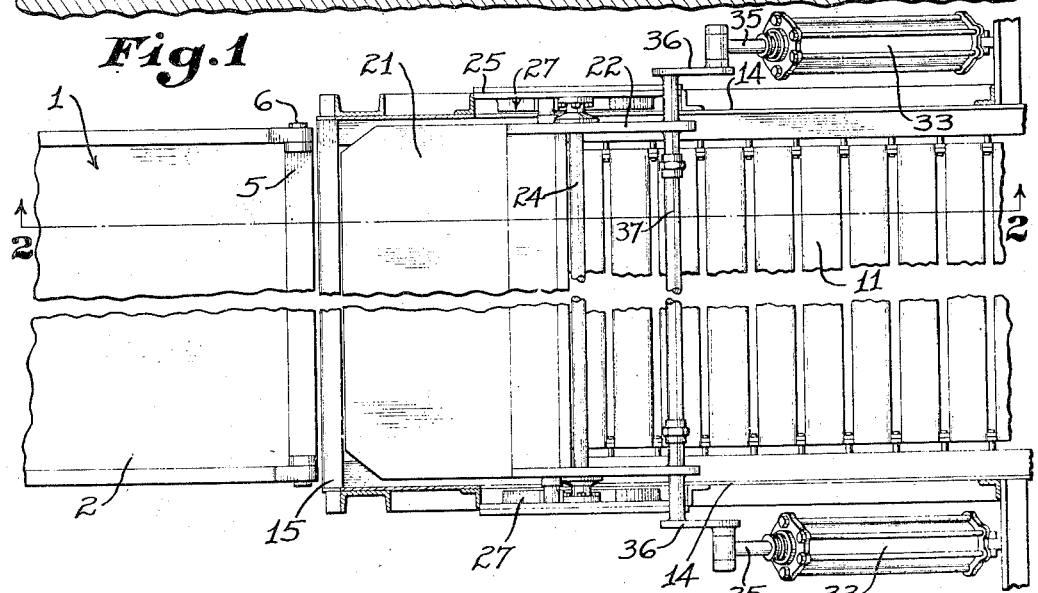
Inventor
MARVIN BAINBRIDGE
NAOTO FUJII
NOBORU MORISHIGE
By Lyon & Lyon
Attorneys

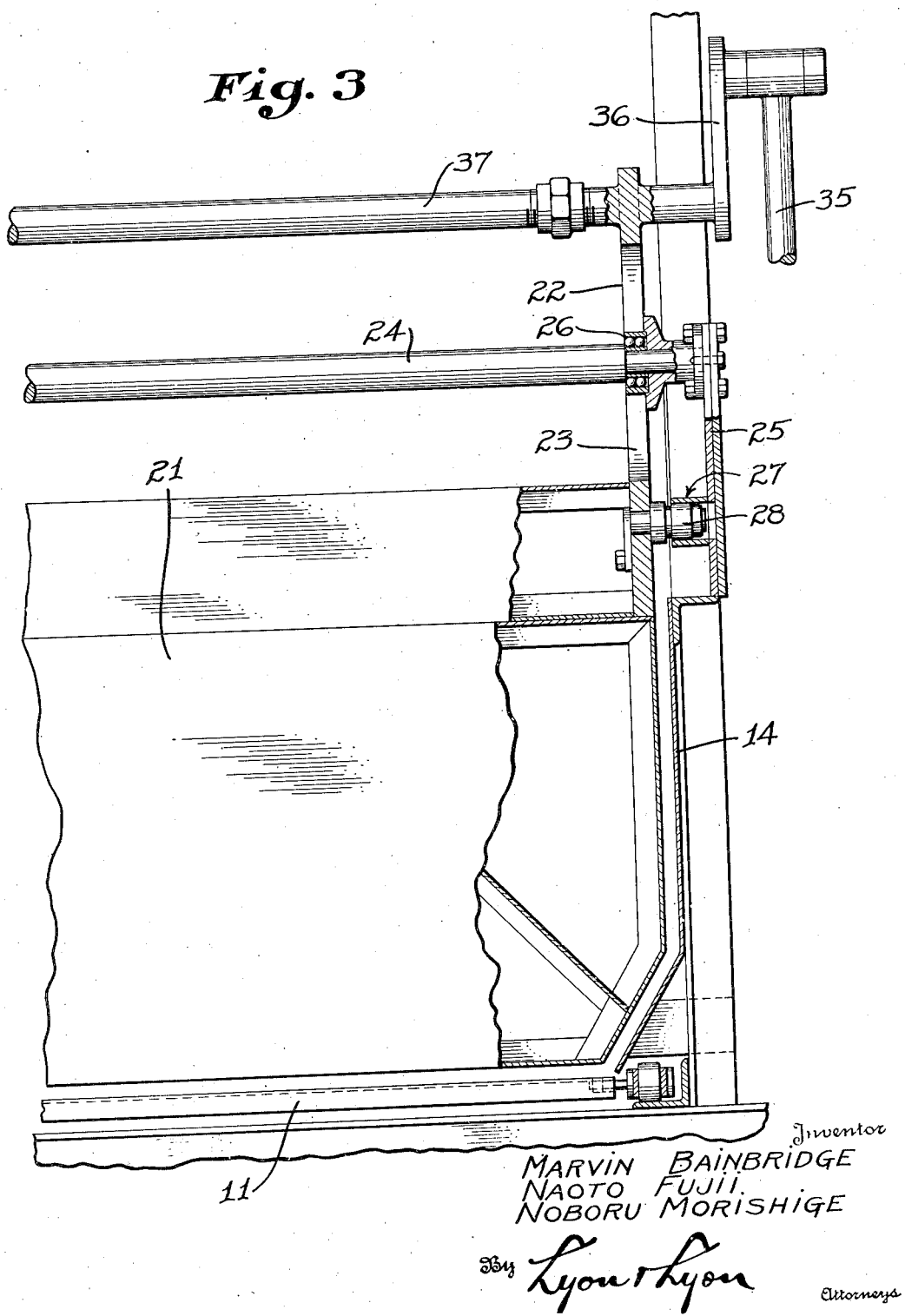

Aug. 23, 1949.    M. BAINBRIDGE ET AL    2,479,665
APPARATUS FOR BULK HANDLING OF PINEAPPLES
Filed May 27, 1946    3 Sheets-Sheet 3

Inventor
MARVIN BAINBRIDGE
NAOTO FUJII
NOBORU MORISHIGE
By Lyon & Lyon
Attorneys Patented Aug. 23, 1949

2,479,665

UNITED STATES PATENT OFFICE 2,479,665

APPARATUS FOR BULK HANDLING OF PINEAPPLES

Marvin Bainbridge and Naoto Fujii, Kahului, and Noboru Morishige, Paia, Territory of Hawaii, assignors to Maui Pineapple Company, Ltd., Honolulu, Territory of Hawaii, a corporation of Hawaii Application May 27, 1946, Serial No. 672,436

5 Claims. (Cl. 214—44)

Our invention relates to an apparatus for conveying pineapples in bulk. Pineapples must be ripened on the plant and be picked at full maturity. In this condition they are easily bruised and must be handled carefully. Until recently this has required manual handling of the fruit from the picking of the fruit in the field to the placement of the fruit on storage or sorting conveyers in the packing house.

Efforts have been made to eliminate insofar as possible the manual handling of pineapples in the field by way of special harvesting apparatus and special trucks having conveyer beds or floors. These have been found satisfactory except in the transfer of the fruit from the trucks to the storage conveyer. Our invention is concerned principally with the solution of this problem and, accordingly, the objects of our invention are:

First, to provide an apparatus for bulk handling of pineapples wherein the fruit is transferred in bulk from a moving bed truck located at an upper level to a moving belt storage conveyer located at a lower level, all without subjecting the fruit to injurious pressure or permitting free falling of the fruit and the resultant impaction against each other or against the storage conveyer.

Second, to provide an apparatus of this type whereby the fruit handled may be stacked to a substantial depth in the truck and caused to be transferred to a storage conveyer without reduction in its stacked depth so that the fruit space requirements are held to a minimum.

Third, to provide an apparatus of this character which incorporates a novel gate positioned and manipulated in conjunction with the movement of the truck bed and the storage conveyer to lower gradually an initial portion of a load of pineapples from the truck to the conveyer, whereupon the gate moves clear of the fruit to permit continued uninterrupted flow until the truck is empty.

With the above and other objects in view, as may appear hereinafter, reference is directed to the accompanying drawings in which:

Figure 1 is a fragmentary plan view of our apparatus for effecting transfer of fruit from the moving bed truck to a storage conveyer, the truck and the conveyer being shown fragmentarily.

Figure 2 is a fragmentary longitudinal sectional view thereof through 2—2 of Figure 1 showing by solid lines the pineapples lowering gate in its initial position, and by broken lines the gate in an intermediate position.

Figure 3 is an enlarged fragmentary sectional view thereof through 3—3 of Figure 2, the lowering gate being shown in the broken line position of Figure 2.

Figure 4:
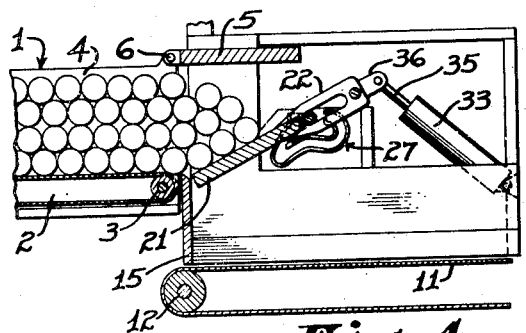

Figures 4 to 10, inclusive, are substantially diagrammatic, fragmentary sectional views of the apparatus shown in Figure 1, illustrating in sequence the stages involved in effecting transfer of the fruit on to the storage conveyer and, in particular, illustrating the manner in which the lowering gate controls movement of the initial quantity of fruit.

The truck 1, with which our apparatus is designed to be employed, is provided with a moving bed or floor 2, which passes over a roller 3 at the rear end of the truck body. The truck is provided with sides 4 and a tail gate 5. The tail gate is preferably hinged as indicated by 6 along the upper edge so that the lower portion of the gate may be swung outwardly and upwardly away from the conveyer bed 2.

The other structure with which our apparatus is employed includes a storage conveyer 11 of conventional construction, which passes around the end sprocket 12. A suitable stall 13 is provided, into which the truck 1 may be backed so as to bring the discharge end of the conveyer bed 2 over the receiving end of the storage conveyer 11.

Side walls 14 extend along each side of the conveyer, and an end wall 15 extends across the receiving end of the conveyer and is of such height that its upper end reaches approximately to the level of the conveyer bed 2. The truck is positioned so that the discharge end of the conveyer bed is contiguous to the upper margin of the end wall 15 and this margin is beveled so that the fruit, on discharging from the truck, rolls over the end wall.

Our apparatus involves a lowering gate 21, which extends between the side walls 14 and is provided with end arms 22 extending parallel to the side walls 14. The end arms 22 are provided with slots 23 extending in the plane of the lowering gate 21. A shaft 24 extends between the side walls 14 and through the slots 23. The extremities of the shaft 24 are suitably supported on the mounting plates 25 located above and carried by the side walls 14. The shaft is preferably provided with antifriction rollers 26, which ride within the slots 23.

Mounting plates 25 support a cam 27 of channel shaped section. A bracket extends laterally from each end of the gate 21 and is provided with a cam roller 28, which rides in the corresponding channel cams 27. The cam rollers 28 are located adjacent the slots 23 and the shape of the channel cams 27 is such that when the gate 21 is pivoted about a resultant moving point defined by the axis of the shaft 24, the length of the slot 23 and the cams 27, the extended lower edge of the gate is caused to move down the face of the end wall 15 to the storage conveyer 11 and then along the adjacent storage conveyer 11 for a predetermined distance and then upwardly and away from the storage conveyer.

In order to accomplish this movement, each cam comprises a downwardly and forwardly directed leg 29 pointing in the general direction of the base of the end wall 15. At the lower extremity of the leg 29 the cam forms a return bend and an upwardly and a rearwardly directed leg 30 which diverges from the leg 29. The leg 30 then curves to form a horizontal portion 31 directed away from the end wall 15, and then loops upwardly to form a curved end 32.

Movement of the gate is accomplished by means of operating cylinders 33 which are mounted on pivoted brackets 34 located outside the side walls 14. The operating cylinders 33 are provided with piston rods 35 which extend upwardly and forwardly and join two crank arms 36 supported from the end arms 22. In order to brace the end arms 22 and crank arms 33, the extremities of the end arms are joined by a brace rod 37.

In order to visualize the operation of the gate to effect transfer of pineapples from a truck to a conveyer, reference is particularly directed to the diagrammatic views, Figures 4 to 10, inclusive. In Figure 4 the fruit is shown stacked on the moving bed of a truck just after the tail gate has been opened and an initial quanity of fruit moved from the truck bed on to the gate 21. In this initial position, the lower edge of the gate is contiguous to the upper margin of the end wall 15 and the gate slopes upwardly and rearwardly therefrom at a slight angle. As fruit continues to be discharged from the truck, the gate is lowered from the position shown in Figure 4 to that shown in Figure 5, and from this position to that shown in Figure 6.

Figure 8:
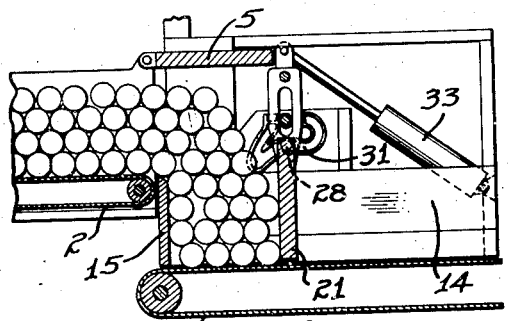
Figure 5:
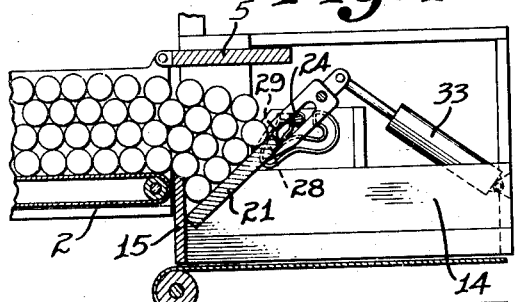
Figure 7:
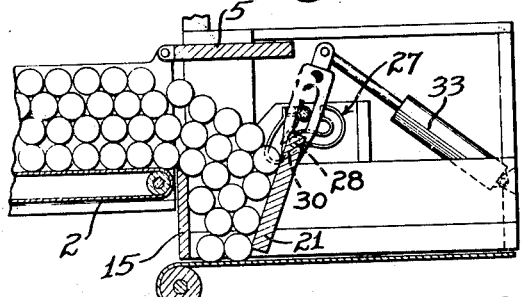

The initial quantity of fruit is thus lowered gradually until, as shown in Figure 7, the initial quantity of fruit rests on the storage conveyer. Continued movement of the gate, as shown in Figure 8, in unison with movement of the truck bed and the storage conveyer causes the fruit to pile as shown in Figure 8 and flow en masse from the truck at a rate determined by the conveyer speed and, thus, at a speed in which bruising is maintained at a minimum.

Figure 9:
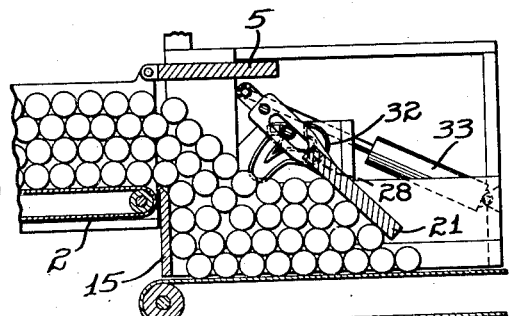
Figure 6:
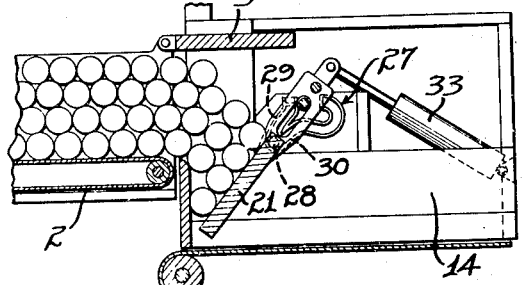
Figure 10:
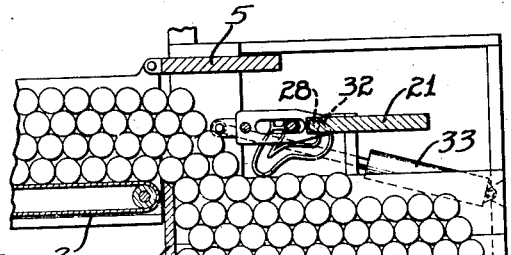

After the fruit has been disposed on the conveyer, the gate swings clear of the fruit, as shown in Figures 9 and 10. The two conveyers continue to operate in unison until the contents of the truck are discharged.

It will be observed that at no time is the fruit permitted to drop from one elevation to a lower point. Instead, the fruit is always fully supported, either by the gate or by other fruit. It is possible to transfer large quantities of fruit in an extremely short time without danger of bruising or otherwise injuring the fruit.

Having fully described our invention, it is to be understood that we do not wish to be limited to the details herein set forth, but our invention is of the full scope of the appended claims.

We claim:

1. An apparatus for transferring bulk pineapples from a moving bed truck to a storage conveyer located at a lower plane parallel to said moving bed, wherein a wall extends from the receiving end of the storage conveyer to the discharge end of the moving bed of said truck, said apparatus comprising: a gate member; pivot and guide means defining a course of movement for said gate member wherein said gate member occupies an initial position continuing laterally from the upper end of said wall over said conveyer and with its receiving end at the level of said truck bed to receive pineapples as discharged therefrom, the receiving end of said gate being movable from said initial position down said wall to said conveyer to deposit said pineapples thereon, and caused to travel along said conveyer, and thereupon swing upwardly clear of the fruit thereon; and drive means for moving said gate member through said course as determined by said pivot and guide means.

2. The combination, with a moving bed truck and a conveyer disposed at a lower level, of an apparatus adapted to establish a continuous mass movement of pineapples from the truck to the conveyer, comprising: a wall extending from the receiving end of said conveyer to the discharge end of said moving bed; a gate member; a pivot and slotted arm means and a cam track and follower means at each end of said gate member, said means coacting to define a course of movement for said gate member wherein said gate member occupies an initial position forming an extension of the bed of said truck, and moves downwardly therefrom with one margin of said gate in proximity to said wall until adjacent said conveyer, then travels along said conveyer away from said wall, and then swings clear of said conveyer, thereby to establish a continuous mass of pineapples moving from the bed of the truck to said conveyer.

3. The combination, with a moving bed truck and a conveyer disposed at a lower level, of an apparatus adapted to establish a continuous mass movement of pineapples from the truck to the conveyer, comprising: a wall extending from the receiving end of said conveyer to the discharge end of said moving bed; a gate member extending across the receiving end of said conveyer; a pivot and sliding arm means, a cam track and follower means and a reciprocating instrumentality, all coacting to support and move said gate member about a predetermined course wherein the extended margin of said gate follows a path defined by said wall and said conveyer to lower fruit gradually to said conveyer as discharged from said truck bed and establish a column of fruit between said conveyer and truck bed, then move clear of said column to permit continuous mass movement of fruit as said truck bed and conveyer are moved in unison.

4. The combination, with a moving bed truck and a conveyer disposed at a lower level, of an apparatus adapted to establish a continuous mass movement of pineapples from the truck to the conveyor, comprising: a wall extending from the receiving end of said conveyor to the discharge end of said moving bed; a gate member extending across the receiving end of said conveyor; a pivot member; a slotted connection between said pivot member and gate to permit limited radial movement of said gate relative to said pivot; a cam track mounted at the ends of said gate; cam followers carried by said gate and coacting with said cam track; means for moving said gate about a course determined by said slotted connection and cam track wherein the extended margin of said gate follows a path defined by said wall and said conveyor to lower fruit gradually to said conveyor as discharged from said truck bed and establish a column of fruit between said conveyor and truck bed, then move clear of said column to permit continuous mass movement of fruit as said truck bed and conveyor are moved in unison.

5. The combination, with a moving bed truck and a conveyor disposed at a lower level, of an apparatus adapted to establish a continuous mass movement of pineapples from the truck to the conveyor, comprising: a wall extending from the receiving end of said conveyor to the discharge end of said moving bed; a gate member extending across the receiving end of said conveyor; means for pivotally supporting said gate, said means providing limited radial movement of said gate relative to said supporting means; a cam track and cam follower means also supporting said gate; and means for moving said gate about a course determined by said cam track and said pivotal supporting means wherein the extended margin of said gate follows a path defined by said wall and said conveyor to lower fruit gradually to said conveyor as discharged from said truck bed and establish a column of fruit between said conveyor and truck bed, then move clear of said column to permit continuous mass movement of fruit as said truck bed and conveyor are moved in unison.

MARVIN BAINBRIDGE.
NAOTO FUJII.
NOBORU MORISHIGE.

REFERENCES CITED

The following references are of record in the file of this patent:

UNITED STATES PATENTS

| Number | Name | Date |
| --- | --- | --- |
| 2,261,105 | Blanot et al. | Nov. 4, 1941 |
| 2,406,992 | Butler | Sept. 3, 1946 |